(12) United States Patent
Schauble et al.

(10) Patent No.: US 9,829,872 B2
(45) Date of Patent: Nov. 28, 2017

(54) METHOD FOR PARAMETERING A FIELD DEVICE

(71) Applicant: Endress + Hauser GmbH + Co. KG, Maulburg (DE)

(72) Inventors: Harald Schauble, Lorrach (DE); Niels Donkers, Ede (NL)

(73) Assignee: Endress+ Hauser GmbH+ Co. KG, Maulburg (DE)

( * ) Notice: Subject to any disclaimer, the term of this patent is extended or adjusted under 35 U.S.C. 154(b) by 175 days.

(21) Appl. No.: 14/896,523

(22) PCT Filed: May 19, 2014

(86) PCT No.: PCT/EP2014/060187
§ 371 (c)(1),
(2) Date: Dec. 7, 2015

(87) PCT Pub. No.: WO2014/198491
PCT Pub. Date: Dec. 18, 2014

(65) Prior Publication Data
US 2016/0124408 A1    May 5, 2016

(30) Foreign Application Priority Data
Jun. 12, 2013  (DE) .................. 10 2013 106 098

(51) Int. Cl.
*G05B 11/01*   (2006.01)
*G05B 19/042*  (2006.01)
*H04B 5/00*    (2006.01)

(52) U.S. Cl.
CPC ....... *G05B 19/042* (2013.01); *G05B 19/0426* (2013.01); *H04B 5/0037* (2013.01);
(Continued)

(58) Field of Classification Search
CPC .................................................. G05B 19/05
See application file for complete search history.

(56) References Cited

U.S. PATENT DOCUMENTS

| 7,262,693 B2 | 8/2007 | Karschnia |
| 8,995,915 B2 | 3/2015 | Laible et al. |

(Continued)

FOREIGN PATENT DOCUMENTS

| CN | 101489119 A | 7/2009 |
| CN | 101716663 A | 6/2010 |

(Continued)

OTHER PUBLICATIONS

English Translation of International Preliminary Report on Patentability, WIPO, Geneva, dated Dec. 23, 2015.
(Continued)

*Primary Examiner* — Daniel Puentes
(74) *Attorney, Agent, or Firm* — Bacon & Thomas, PLLC

(57) ABSTRACT

A method for parametering a field device of automation technology by means of a service device. The field device includes at least a battery, a radio module and a non-volatile memory. The battery supplies the radio module and the non-volatile memory, in which parameters of the field device are stored, with energy. The method comprises the steps of: establishing a wireless connection between the servicing device and the battery operated radio module of the field device, wherein the field device is operated offline; reading and/or writing parameters of the field device stored in the non-volatile memory; terminating the wireless connection between the servicing device and the battery operated radio module of the field device; connecting the field device to a two-wire line for energy supply of the field device; and parametering the field device after connecting to the two-wire line, wherein, for parametering, at least parameters stored in the non-volatile memory are accessed.

8 Claims, 1 Drawing Sheet

(52) U.S. Cl.
CPC .............. *G05B 2219/23406* (2013.01); *G05B 2219/25428* (2013.01); *G05B 2219/33192* (2013.01)

(56) References Cited

U.S. PATENT DOCUMENTS

| | | |
|---|---|---|
| 2009/0102601 A1 | 4/2009 | Mathiesen et al. |
| 2010/0161081 A1* | 6/2010 | Seiler .................. G05B 19/0423 700/12 |
| 2012/0220218 A1 | 8/2012 | Laible et al. |
| 2012/0296483 A1 | 11/2012 | Seiler et al. |

FOREIGN PATENT DOCUMENTS

| | | |
|---|---|---|
| CN | 102629123 A | 8/2012 |
| CN | 102662701 A | 9/2012 |
| DE | 102007053057 A1 | 5/2009 |
| DE | 102009046503 A1 | 5/2011 |
| DE | 102009047542 A1 | 6/2011 |
| DE | 102011118310 A1 | 5/2012 |
| EP | 1293853 A1 | 3/2003 |
| EP | 1862877 A1 | 12/2007 |
| WO | 2011054618 A1 | 5/2011 |

OTHER PUBLICATIONS

International Search Report EPO, The Netherlands, dated Aug. 22, 2014.
German Search Report, German PTO, Munich, dated Feb. 14, 2014.

* cited by examiner

METHOD FOR PARAMETERING A FIELD DEVICE

TECHNICAL FIELD

The invention relates to a method for parametering a field device of automation technology by means of a service device.

BACKGROUND DISCUSSION

Furthermore, the invention relates to a field device of automation technology, as well as to a servicing device for parametering such a field device.

In process automation technology, field devices are often applied, which serve for registering and/or influencing process variables. Examples of such field devices are fill level measuring devices, mass flow measuring devices, pressure- and temperature measuring devices, etc. In such case, sensors register the corresponding process variables, such as fill level, flow, pressure and/or temperature.

Serving for influencing process variables are actuators, e.g. valves or pumps, via which e.g. the flow of a liquid in a pipeline section, respectively the fill level in a container, can be changed.

Referred to as field devices are, in principle, all devices, which are applied near to the process and deliver, or process, process relevant information.

A large number of such field devices are produced and sold by the firm, Endress+Hauser.

Known are field devices, which via a 4.20 mA electrical current interface, respectively two-wire line, are integrated into an automation plant. The terminology, integrated, means that the field device is supplied with energy by, and can exchange measured values or also actuating values, with the control system.

Besides such field devices, there are also so called four-wire field devices, which due to their higher energy requirement are integrated into the automation plant via two separate energy supply-lines.

This state wherein the field device is supplied with energy via a two-wire line or a four-wire line will be referred to herein as "online". In contrast therewith, the state, in the case of which a field device is not connected to a two-wire line and, thus, also cannot be supplied with energy thereby, will be referred to herein as "offline". Of course, a field device, which is "offline" also exchanges no measured values or actuating values with the control system.

Likewise known is that the way, in which a field device works, is established with the assistance of parameters, which are written into modules provided therefor, respectively into specific memory locations of the field device. By storing suitable parameter values in the respective modules, respectively memory locations, the way, in which the field device works, is established. This procedure is referred to as "parametering". The setting of the parameters is performed, for example, by the customer. By selecting suitable parameter values, the customer can adapt the field device to its particular application. Such parameters, for example, in the case of a fill level measuring device for measuring the fill level of a medium in a tank, are the height and the diameter of the tank.

The parametering of such field devices takes place, in such case, currently in the "online" state of the field device.

For this, the field device is first physically connected to the two-wire line and then the field device is parametered by means of a service device.

This procedure has the disadvantage that a service technician must be present for the entire parametering at the possibly unfavorable location of installation of the field device, where the field device is connected for energy supply by means of the two-wire line.

SUMMARY OF THE INVENTION

An object of the invention is to provide a method that enables a simpler parametering of a field device by an operator.

The object is achieved by a method for parametering a field device of automation technology by means of a service device, wherein the field device includes at least a battery, a radio module and a non-volatile memory, wherein the battery supplies the radio module and the non-volatile memory, in which parameters of the field device are stored, with energy and wherein the method comprises steps as follows:

establishing a wireless connection between the servicing device and the battery operated radio module of the field device, wherein the field device is operated offline;

reading and/or writing parameters of the field device stored in the non-volatile memory;

terminating the wireless connection between the servicing device and the battery operated radio module of the field device;

connecting the field device to a two-wire line for energy supply of the field device; and parametering the field device after connecting to the two-wire line, wherein, for parametering, at least parameters stored in the non-volatile memory are accessed.

Furthermore, a field device is described, which is suited for performing the methods.

According to the invention, the simpler parametering is achieved by features including that the field device has a radio module, which works, for example, according to the Bluetooth low energy protocol, wherein the radio module is supplied with energy via a battery in the case that the field device is located in the "offline" mode and, thus, receives no energy via the two-wire line. In this way, a preparametering of the field device can take place outside of the intended location of installation of the field device by means of parameters, which, at that point in time, are already established, respectively have been established. For this, the parameters are written into a non-volatile memory of the field device, which is likewise supplied with energy by means of the battery in the offline state.

Then, the preparametered field device is connected to the two-wire line and the field device performs a "complete" parametering, in which it accesses the parameters of the non-volatile memory and writes the parameters corresponding to their purpose into the provided modules, respectively specific memory locations of the field device.

In an advantageous form of embodiment, the energy supply of at least the radio module by the battery is activated via a switch. In this way, the discharge period and, thus, the service life of the battery can be increased, since the radio module is supplied with energy not continuously, but, instead, as needed, respectively with targeting.

In an additional advantageous form of embodiment, the transfer of the parameters between the radio module and the non-volatile memory is performed with a microprocessor integrated in the radio module. Radio module with an integrated microprocessor permit an especially simple implementing of the transfer of parameters between the radio module and the non-volatile memory.

In an alternative advantageous form of embodiment, the field device includes arranged outside of the radio module a microprocessor, with which the transfer of the parameters between the radio module and the non-volatile memory is performed. Such an implementing of the transfer of the parameters between the radio module and the non-volatile memory offers the advantage that the energy consumption of the battery can be further reduced, since a microprocessor can be applied, which receives yet less energy than, for example, a microprocessor integrated in the radio module.

In an additional advantageous form of embodiment, after connecting of the field device to the two-wire line, the radio module is supplied with energy via the two-wire line, wherein further parametering of the field device is performed by means of the radio module.

In an additional advantageous form of embodiment, the wireless connection by means of the radio module is performed according to the Bluetooth low energy or the ANT+ or the WLAN protocol.

In an alternative form of embodiment, the wireless connection is performed by means of the radio module according to a proprietary radio protocol.

Further described is a field device of automation technology, which is suitable for performing the method according to one of the preceding forms of embodiment, wherein the field device comprises at least a radio module, a battery and a non-volatile memory, wherein the battery supplies the radio module and the non-volatile memory with energy, when the field device is located in the offline state. In this way, an offline parametering of the field device can be performed.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
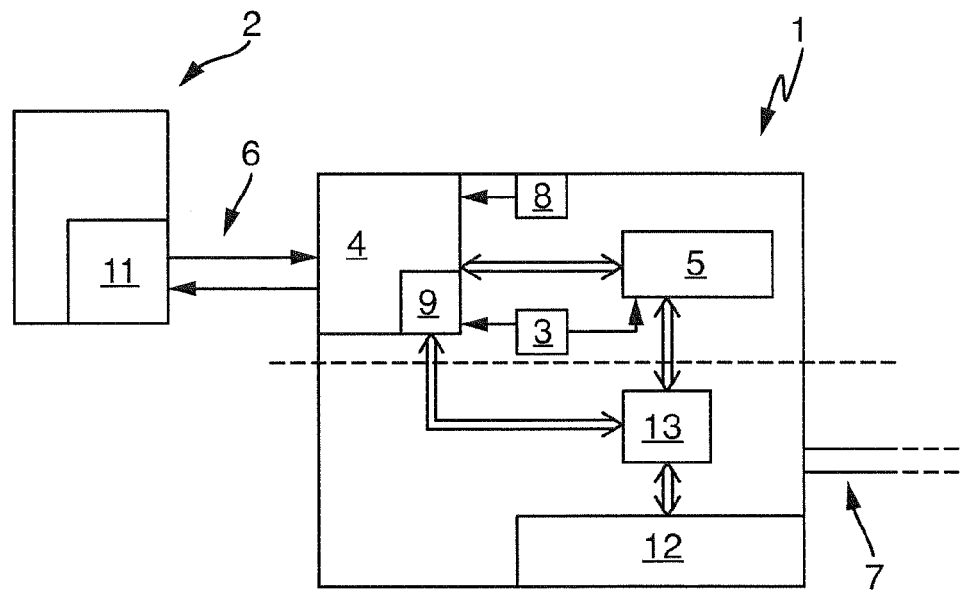
FIG. 1 is a schematic representation of a first embodiment of a field device as well as a service device, which are suitable for performing the method of the invention.

FIG. 1 shows a schematic representation of a field device 1 as well as a service device 2, which are suitable for performing the method of the invention.

The field device 1 includes, in such case, a battery 3, a radio module 4, for example, a Bluetooth low energy (acronym: BLE) module, and a non-volatile memory 5, in which parameters, which are fed to the field device 1 in the case of offline parametering, are stored.

The battery 3 is installed in the field device 1 in such a manner that it supplies the radio module 4 and the non-volatile memory 5 with energy, particularly when the field device 1 is not connected to a two-wire line 7, and thus is located in the offline state. By means of a switch 8, the radio module 4 can be activated, respectively deactivated. Thus, the energy supply of the radio module 4 by the battery 3 can be limited to the time span of the offline parametering. In this way, the discharge time, respectively service life, of the battery 3 can be increased. The battery 3 supplies besides the radio module 4 also the non-volatile memory 5 of the field device.

The non-volatile memory 5 serves to store parameters transmitted during the offline parametering of the field device, so that the parameters are available after the connecting of the field device 1 to the two-wire line 7 and the therewith associated, complete energy supply of the field device 1.

By connecting the field device 1 to the two-wire line 7, other modules 12, 13 of the field device 1, such as, for example, a main processor 13 and/or also a sensor/actuator module 12, are supplied with energy, modules which in the offline state of the field device 1 are not supplied with energy by the battery 3.

Figure 2:
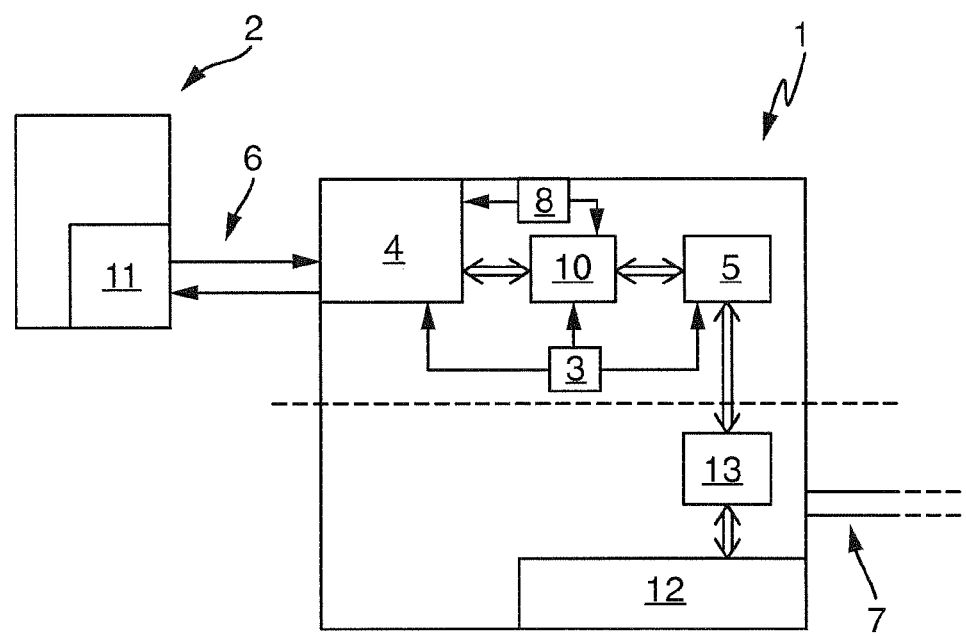
FIG. 2 is an alternative schematic representation of a field device as well as a service device, which are suitable for performing the method of the invention.

FIG. 2 shows an alternative schematic representation of a field device 1 as well as a service device 2, which are suitable for performing the method of the invention. In such case, the radio module 4 of the field device 1 includes no integrated microprocessor 9, but, instead, arranged outside of the radio module 4, a microprocessor 10, which performs the transfer of the parameters between the radio module 4 and the non-volatile memory 5.

Furthermore, both FIG. 1 as well as also FIG. 2 show a servicing device 2, which has, compatible with the radio module 4 of the field device 1, a radio module 11, which, depending on the embodiment of the radio module 4 of the field device 1, works according to the Bluetooth low energy- or the ANT+- or the WLAN protocol or a proprietary radio protocol. Such a servicing device can be, for example, a smart phone, mobile telephone, laptop, tablet PC, PDA, netbook, etc.

In the following, the method of the invention will now be explained in further detail. This is divided, in principle, into two parametering steps, a first offline parametering step, in which parts of the field device 1 are supplied with energy exclusively by the battery 3, and a second online parametering step, in which the field device 1 is fed completely with energy via the two-wire line 7 and is parametered with the parameters, which were furnished in the non-volatile memory 5 in the offline parametering.

The offline parametering includes, in such case, steps as follows:

establishing a wireless connection 6 between a servicing device 2 and the battery operated radio module 4 of the field device, wherein the field device 1 is operated offline;

reading and/or writing parameters of the field device 1 stored in the non-volatile memory 5; and terminating the wireless connection 6 between the servicing device 2 and the battery operated radio module 4 of the field device 1.

This first offline parametering step does not absolutely have to take place at the intended location of use of the field device 1, but, instead, can, for example, also take place at a site outside of the automation plant. In this way, the parametering of the field device 1 can be performed by an operator in especially simple manner.

Then, the preparametered field device 1 is connected to a two-wire line 7 of the automation plant, and, thus, also fed completely (i.e. all modules 4, 5, 8, 9, 10, 12, 13 associated with the field device 1) with energy.

The subsequent online parametering provides that the field device 1, after it is connected to the two-wire line 7, accesses at least the parameters furnished in the non-volatile memory 5, in order to be able to perform the parametering of all of the modules 4, 5, 8, 9, 10, 12, 13 associated with the field device 1. Other options include here that during the online parametering, besides the parameters furnished in the non-volatile memory 5, also other parameters are fed via a servicing device 2 to the field device 1 for its parametering. This can be performed, for example, again, via the radio module 4 of the field device 1 by means of a correspondingly formed service device 2, wherein, in that case, the radio module of the field device is supplied with energy via the two-wire line 7 and not by means of the battery 3.

The invention claimed is:

1. A method for parametering a field device of automation technology by means of a service device, the field device includes at least a battery, a radio module and a non-volatile memory, the battery supplies the radio module and the non-volatile memory, in which parameters of the field device are stored, with energy, the method comprises the steps as follows:
    establishing a wireless connection between the servicing device and the battery operated radio module of the field device, wherein the field device is operated offline;
    reading and/or writing parameters of the field device stored in the non-volatile memory
    terminating the wireless connection between the servicing device and the battery operated radio module of the field device;
    connecting the field device to a two-wire line for energy supply of the field device; and
    parametering the field device after connecting to the two-wire line, wherein:
    for parametering, at least parameters stored in the non-volatile memory are accessed.

2. The method as claimed in claim 1, wherein:
    energy supply of the radio module by the battery is activated via a switch before establishing the wireless connection.

3. The method as claimed in claim 1, wherein:
    transfer of the parameters between the radio module and the non-volatile memory is performed with a microprocessor integrated in the radio module.

4. The method as claimed in claim 1, wherein:
    the field device further includes, arranged outside of the radio module, a microprocessor, with which transfer of the parameters between the radio module and the non-volatile memory is performed.

5. The method as claimed in claim 1, wherein:
    the radio module is supplied with energy by the two-wire line when the field device is connected to the two-wire line and wherein other parameterings of the field device are performed by means of the radio module.

6. The method as claimed in claim 1, wherein:
    the wireless connection by means of the radio module is performed according to the Bluetooth low energy or the ANT+ or the WLAN protocol.

7. The method as claimed in claim 1, wherein:
    the wireless connection is performed by means of the radio module according to a proprietary radio protocol.

8. A field device of automation technology for application in a method comprising the steps of: establishing a wireless connection between the servicing device and the battery radio module of the field device, wherein the field device is operated offline; reading and/or writing parametering of the field device stored in the non-volatile memory; terminating the wireless connection between the servicing device an the battery operated radio module of the field device; connecting the field device to a two-wire line for energy supply of the field device; and parametering the field device after connecting to the two-wire line, wherein for parametering, at least parameters stored in the non-volatile memory are accessed, wherein the field device comprises:
    at least a radio module; a battery; and a non-volatile memory, wherein:
    said battery supplies said radio module and said non-volatile memory with energy, when the field device is located in the offline state.

* * * * *